US009203633B2

(12) United States Patent
Chu et al.

(10) Patent No.: US 9,203,633 B2
(45) Date of Patent: Dec. 1, 2015

(54) MOBILE GROUP CONFERENCING WITH PORTABLE DEVICES

(75) Inventors: Peter L. Chu, Lexington, MA (US); Yibo Liu, Reading, MA (US); Zhemin Tu, Austin, TX (US); Jonathan Gallmeier, Austin, TX (US); Krishna Sai, Austin, TX (US)

(73) Assignee: Polycom, Inc., San Jose, CA (US)

( * ) Notice: Subject to any disclaimer, the term of this patent is extended or adjusted under 35 U.S.C. 154(b) by 541 days.

(21) Appl. No.: 13/544,271

(22) Filed: Jul. 9, 2012

(65) Prior Publication Data

US 2013/0106975 A1      May 2, 2013

Related U.S. Application Data

(63) Continuation-in-part of application No. 13/282,609, filed on Oct. 27, 2011.

(51) Int. Cl.
*H04N 7/14* (2006.01)
*H04L 12/18* (2006.01)
*H04M 3/56* (2006.01)
*H04N 7/15* (2006.01)

(52) U.S. Cl.
CPC ........... *H04L 12/1822* (2013.01); *H04M 3/567* (2013.01); *H04M 3/569* (2013.01); *H04N 7/15* (2013.01); *H04L 12/189* (2013.01)

(58) Field of Classification Search
USPC .......... 348/14.02, 14.03, 14.08, 14.01, 14.09, 348/211.12, E7.077, E7.083, 499; 455/517; 379/93.21, 158, 202.01, 205.01, 379/388.01
See application file for complete search history.

(56) References Cited

U.S. PATENT DOCUMENTS

| 5,263,019 A | 11/1993 | Chu |
| 5,305,307 A | 4/1994 | Chu |
| 5,390,244 A | 2/1995 | Hinman et al. |

(Continued)

FOREIGN PATENT DOCUMENTS

| EP | 1578129 A1 | 9/2005 |
| JP | 2005-260348 A | 9/2005 |

(Continued)

OTHER PUBLICATIONS

First Office Action in counterpart Japanese Appl. P2012-236885, dated Jan. 21, 2014.

(Continued)

*Primary Examiner* — Yosef K Laekemariam
(74) *Attorney, Agent, or Firm* — Blank Rome, LLP

(57) ABSTRACT

A master device (e.g., a laptop) controls a videoconference connection with a far-end and acts as a controller for slave devices in a group. The master establishes the connection with the far-end using a wide area network and connects with the slaves using a Wi-Fi connection of a local area connection. To connect to the slaves, the master outputs an ultrasonic beacon encoding the master's address in the local network. The beacon also allows differences in the various clocks to be handled during audio processing. During the videoconference, the master outputs far-end audio to a loudspeaker and sends the far-end video to its display and to the slaves. Each device captures audio/video with its microphone and camera. The master determines which captured audio is a dominant talker's and may only send that audio to the far-end. The video associated with the dominant talker's device may also be sent to the far-end.

24 Claims, 11 Drawing Sheets

(56) References Cited

U.S. PATENT DOCUMENTS

| | | | |
|---|---|---|---|
| 6,959,260 | B2 | 10/2005 | Rodman et al. |
| 7,120,259 | B1 | 10/2006 | Ballantyne et al. |
| 7,526,078 | B2 | 4/2009 | Rodman et al. |
| 7,680,285 | B2 | 3/2010 | Ballantyne et al. |
| 7,742,588 | B2 | 6/2010 | Rodman et al. |
| 7,787,605 | B2 | 8/2010 | Rodman |
| 7,864,938 | B2 | 1/2011 | Rodman et al. |
| 7,978,838 | B2 | 7/2011 | Rodman et al. |
| 8,320,554 | B1 | 11/2012 | Chu |
| 2002/0152314 | A1 | 10/2002 | Hayek et al. |
| 2004/0059446 | A1 | 3/2004 | Goldberg et al. |
| 2004/0137929 | A1* | 7/2004 | Jones et al. ............... 455/517 |
| 2004/0145654 | A1 | 7/2004 | Motohashi |
| 2004/0264713 | A1 | 12/2004 | Grzesek |
| 2006/0192849 | A1 | 8/2006 | Inoue |
| 2006/0215585 | A1 | 9/2006 | Taniwaki |
| 2007/0047738 | A1 | 3/2007 | Ballantyne et al. |
| 2007/0165836 | A1 | 7/2007 | Li et al. |
| 2007/0165838 | A1 | 7/2007 | Li et al. |
| 2007/0273751 | A1 | 11/2007 | Sachau |
| 2008/0024593 | A1 | 1/2008 | Tsirinsky et al. |
| 2009/0111443 | A1 | 4/2009 | Gupta |
| 2009/0185695 | A1 | 7/2009 | Marton et al. |
| 2009/0210789 | A1* | 8/2009 | Thakkar et al. ............... 715/719 |
| 2009/0233582 | A1 | 9/2009 | Suzuki et al. |
| 2010/0053169 | A1* | 3/2010 | Cook ...................... 345/440.1 |
| 2010/0081487 | A1 | 4/2010 | Chen et al. |
| 2010/0188473 | A1* | 7/2010 | King et al. .............. 348/14.02 |
| 2011/0069830 | A1 | 3/2011 | Chu et al. |
| 2011/0179182 | A1 | 7/2011 | Vadla Ravnas |
| 2012/0051187 | A1 | 3/2012 | Paulson |
| 2013/0044873 | A1 | 2/2013 | Etter |
| 2014/0164629 | A1 | 6/2014 | Barth et al. |

FOREIGN PATENT DOCUMENTS

| | | | |
|---|---|---|---|
| JP | 2005-341202 A | 12/2005 |
| JP | 2006-140596 A | 6/2006 |
| JP | 2006-238328 A | 9/2006 |
| JP | 2011-45028 A | 3/2011 |
| JP | 2011-512698 A | 4/2011 |
| JP | 2011512698 A | 4/2011 |
| WO | 2008/004879 A2 | 1/2008 |
| WO | 2008004879 A2 | 1/2008 |
| WO | 2009078733 A1 | 6/2009 |

OTHER PUBLICATIONS

Extended European Search report in corresponding EP Appl. 12 189 982.7-1502, dated Feb. 28, 2013.

Wilkinson, Ma, S., et al. "A phase modulation-based ultrasonic communication system using Variable Structure Control," Communication Technology (ICCT), 2010 12th IEEE International Conference, pp. 857,860, Nov. 11-14, 2010.

Kindberg, T. et al., "Validating and Securing Spontaneous Associations between Wireless Devices," HP Laboratories Palo Alto, HPL-2002-256, Sep. 12, 2002.

Lopes, C.V., et al., "Aerial acoustic communications," Applications of Signal Processing to Audio and Acoustics, 2001 IEEE Workshop on the , vol., No., pp. 219-222, 2001.

Holm, S., et al., "Indoors data communications using airborne ultrasound," Acoustics, Speech, and Signal Processing, 2005. Proceedings. (ICASSP '05). IEEE International Conference on , vol. 3, No., pp. iii/957,iii/960 vol. 3, Mar. 18-23, 2005.

Ballal, T. et al., "Design and Implementation of an Indoor Ultrasonic Communication System," 22nd IET Irish Signals and Systems Conference (ISSC), Dublin, Ireland, Jun. 23-24, 2011.

Mayrhofer, R., et al., "On the Security of Ultrasound as Out-of-band Channel," Parallel and Distributed Processing Symposium, 2007, IPDPS 2007, IEEE International, Mar. 26-30, 2007.

First Office Action in counterpart Japanese Appl. P2012-236884, dated Dec. 10, 2013.

First Office Action in co-pending U.S. Appl. No. 13/282,582, mailed Feb. 6, 2014.

Response to First Office Action in co-pending U.S. Appl. No. 13/282,582, filed May 6, 2014.

Notice of Allowance in in co-pending U.S. Appl. No. 13/282,582, mailed May 28, 2014.

First Office Action in co-pending U.S. Appl. No. 13/282,633, mailed Jun. 5, 2014.

Response to First Office Action in co-pending U.S. Appl. No. 13/282,633, filed Sep. 5, 2014.

First Office Action in counterpart Australian Appl. 2012244168, dated Nov. 1, 2013.

Office Action in corresponding U.S. Appl. No. 13/2825,609, mailed Feb. 25, 2014.

Reply to Office Action in corresponding U.S. Appl. No. 13/2825,609, filed Jun. 25, 2014.

Notice of Allowance n co-pending U.S. Appl. No. 13/282,609, mailed Jul. 7, 2014.

* cited by examiner

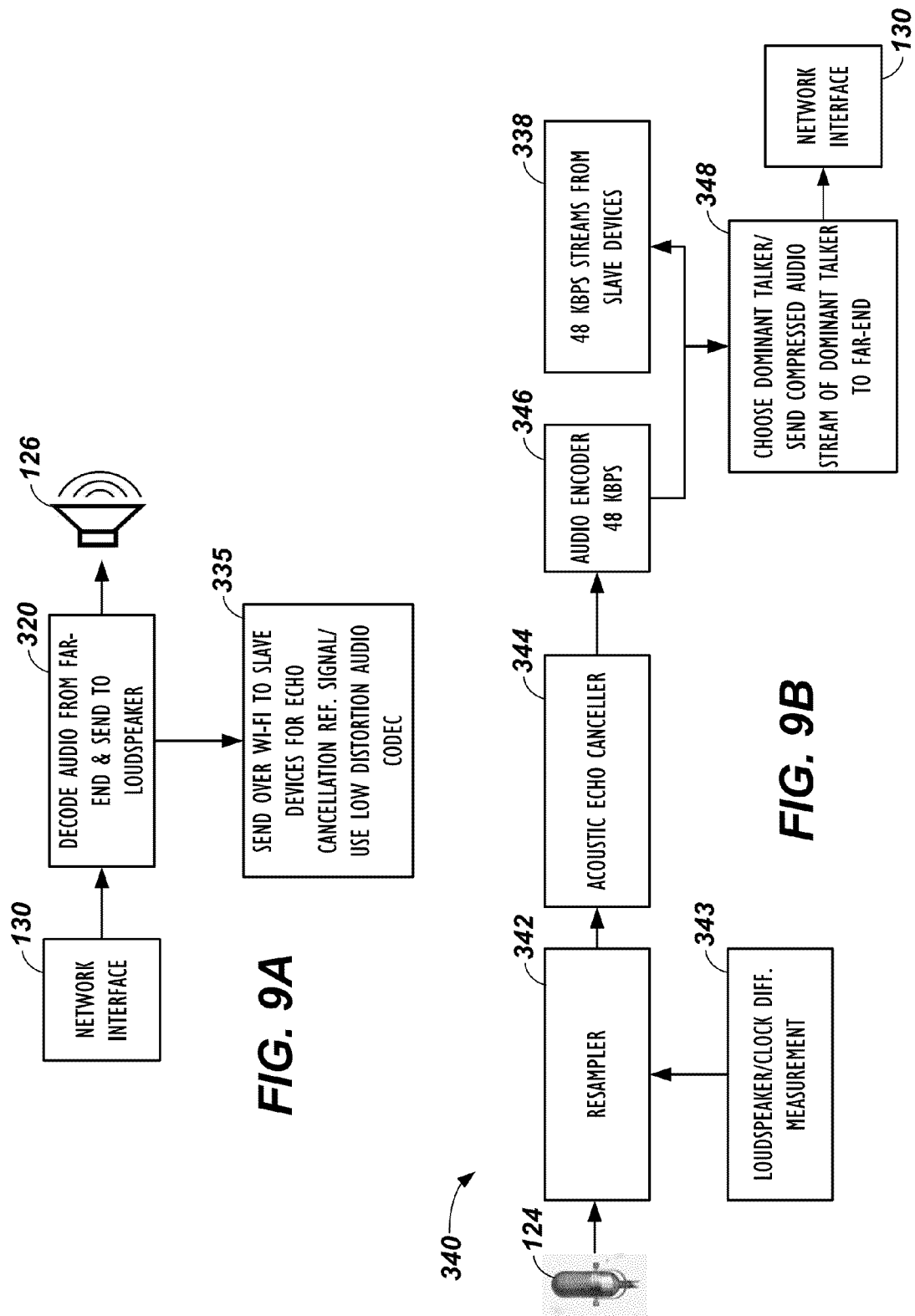

MOBILE GROUP CONFERENCING WITH PORTABLE DEVICES

CROSS-REFERENCE TO RELATED APPLICATIONS

This application is a continuation-in-part of Ser. No. 13/282,609, entitled "Pairing Devices in Conference Using Ultrasonic Beacon" and filed 27 Oct. 2011, which is incorporated herein by reference, to which priority is claimed, and which was filed concurrently with U.S. application Ser. No. 13/282,582 (199-0879US), entitled "Portable Devices as Videoconferencing Peripherals" by Peter L. Chu and Krishna Sai; and U.S. application Ser. No. 13/282,633 (199-0890US2) entitled "Compensating For Different Audio Clocks Between Devices Using Ultrasonic Beacon" by Peter L. Chu and Yibo Liu, both of which are incorporated herein by reference in their entireties.

BACKGROUND OF THE DISCLOSURE

Videoconferencing units are complex devices, requiring complicated functions to operate. Therefore, videoconferencing vendors create special remote controls and menus to operate the units, but these can be hard to learn and use. This is especially true when the unit has several functional capabilities.

Additionally, good quality microphone pickup in a videoconference requires the participants to be no more than 3-feet from the microphones. Therefore, videoconferencing vendors provide special microphones for placement on tables near the participants in a conference room. The microphones often have wires that can get in the way. As a solution, wireless microphones are available for videoconferencing systems, but they need to be repeatedly recharged if used often, which can be inconvenient.

Moreover, groups of people often work and travel together. For example, students in a study group may study together at a library, or business travelers may work together as they travel on business. Using a laptop or a tablet, each person can use a videoconferencing application, such as the Polycom® CMA™ Desktop application, the Skype® application, or the FaceTime® application, to individually videoconference from his device and location. (POLYCOM and CMA are trademarks of Polycom, Inc.; SKYPE is a trademark of Microsoft Corporation; and FACETIME is a trademark of Apple Inc.) However, if all the people are in one conference room in a hotel, library, or other location, they may want to meet with each other and have a videoconference with far-end participants somewhere else.

For mobile group conferencing today, people have to crowd around one laptop or tablet to participate in a videoconference. This is inconvenient for a number of reasons. The display is too small for a group of people to view properly. The camera tends to capture only a wide shot of everyone, and their faces become small in the video image. Additionally, the audio pickup from a single microphone is poor.

The subject matter of the present disclosure is directed to overcoming, or at least reducing the effects of, one or more of the problems set forth above.

SUMMARY OF THE DISCLOSURE

In a mobile group videoconference, a first grouped device, such as a laptop, of a group of devices is a master device. This master device controls the videoconference connection with a far-end and acts as a controller for one or more second grouped devices, such as slave portable devices. The master device establishes the videoconference connection with the far-end using a wide area network and connects with each of the slave devices using a near-end connection, such as a Wi-Fi connection of a local area connection. To connect to the slave devices, the master device outputs an ultrasonic beacon encoding the master device's network (IP) address assigned in the local network. The beacon also allows differences in the various clocks to be determined and later handled during audio processing.

During the videoconference, the master device outputs far-end audio to a loudspeaker. Likewise, the master device sends the far-end video to its display and to the slave devices for display. At the same time, each of the master and slave devices captures audio with its microphone and capture video with its camera. The slave devices send their audio to the master device. In turn, the master device determines which captured audio from the various microphones (either from the slaves or itself) is of a dominant talker, and the master device only sends that audio to the far-end. The video associated with the device having the dominant talker is also preferably only sent to the far-end as well. To do this, each of the slave devices may simply its video to the master device, which then only sends the video of the dominant talker's device to the far end. Alternatively, the master device may first communicate to the slave device that is the dominant talker, at which point only that communicated slave device would send it video to the master device. Moreover, rather than sending just video from one source (i.e., video from either the master device or the slave device with the dominant talker), the master device can send composite video of the videoconference from several such sources.

The foregoing summary is not intended to summarize each potential embodiment or every aspect of the present disclosure.

BRIEF DESCRIPTION OF THE DRAWINGS

FIGS. 9A-9B illustrate audio handling by the master device in the mobile group videoconference.

DETAILED DESCRIPTION OF THE DISCLOSURE

A. Videoconferencing System

Figure 1:
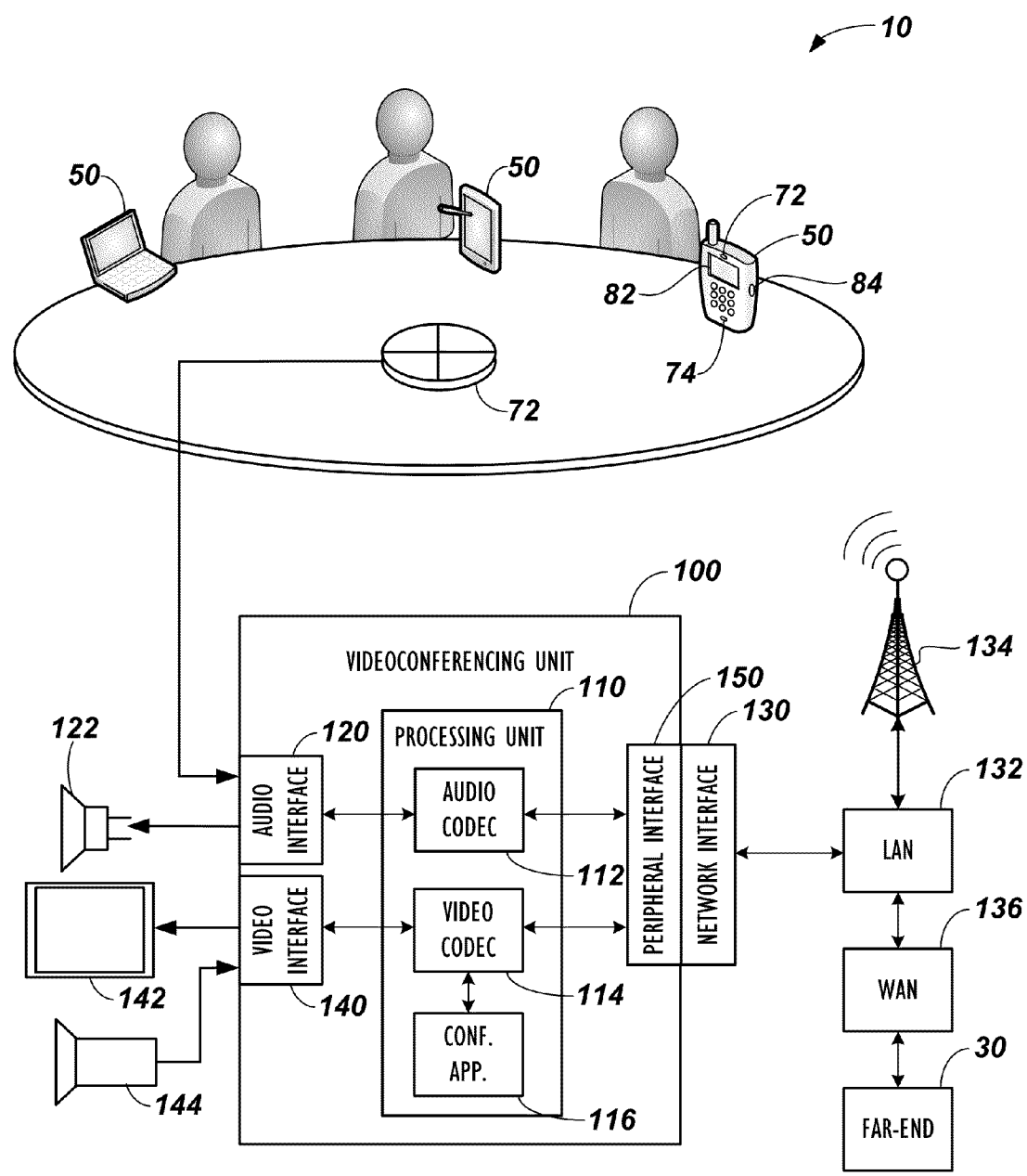
FIG. 1 illustrates a videoconferencing system according to the present disclosure.

A videoconferencing system 10 according to the present disclosure illustrated in FIG. 1 has grouped devices 50 and 100 conducting a video conference as a group with a far end 30. A first of the grouped devices 100 is a videoconferencing unit 100 communicatively connecting with the far end 30, while second grouped devices 50 are peripheral devices communicatively connecting with the videoconferencing unit 100. The video conferencing unit 100 has a loudspeaker 122 coupled to an audio interface 120. Additionally, the unit 100 can use one or more table-mounted microphones 124, a microphone pod, ceiling microphones, or other acoustic devices coupled to the audio interface 120 for capturing audio, but such acoustic devices may be optional in the present system 10. The system 10 also has a display 142 and a camera 144 coupled to a video interface 142 of the unit 100.

Although reference is made herein to the system 10 being used for videoconferencing, the teachings of the present disclosure can apply equally to audio conferencing lacking video. Nevertheless, reference will continue to be made here to videoconferencing for the sake of description.

Internally, the unit 100 has a processing unit 110 with an audio codec 112 and a video codec 114 respectively connected to the audio and video interfaces 120 and 140 for encoding and decoding audio and video for the videoconference. Finally, the unit 100 has a network interface 130 connected to the codecs 112 and 114 for communicating audio and video between the near-end unit 100 and far-end units 30.

During a videoconference, many of the participants would likely have their own portable devices 50 available because portable devices 50 have become a common appliance. Users are comfortable using the portable devices 50, and the videoconferencing unit 100 can use the portable devices 50 as videoconferencing peripherals as disclosed herein.

In general then, one or more second grouped devices 50 (i.e., portable devices) can be used with the videoconferencing unit 100 and can include any of a number of available devices, including, but not limited to, peripheral devices, cellular telephones, smartphones, tablet PCs, touch screen PCs, PDAs, hand-held computers, netbook computers, laptop computers, and the like. Additionally and as discussed later, the portable devices 50 can have processing capabilities and functionality for operating a camera, a display, and a microphone and for connecting to a network, such as Wi-Fi network, Internet, and the like. In fact, the videoconferencing unit 100 may itself be a portable device, such as a laptop computer or the like.

In general, the network interface 130 can connect to the far-end units 30 via an Ethernet connection, a wireless connection, an Internet connection, a POTS connection, or any other suitable connection for videoconferencing or combination thereof. As part of the network interface 130 or separate therefrom, the unit 100 includes a peripheral interface 150 that enables the videoconferencing unit 100 to communicate with local peripherals, such as the portable devices 50. In the current example, the network interface 130 connects the unit 100 to a local intranet of a local area network (LAN) 132, which connects in turn to a wide area network (WAN) 136, such as the Internet. The LAN 132 may have a wireless local area network (WLAN), Wireless Fidelity (Wi-Fi) network, personal area network (PAN) (e.g., Bluetooth), or similar type of wireless network 134 for connecting to the portable devices 50. Accordingly, participants can connect their portable devices 50 with the wireless network 134 to the LAN 132 so transport between the portable devices 50 and the videoconferencing unit 100 can use the wireless network 134 and the LAN 132.

In many instances, the portable devices 50 can have high quality microphones 74, and the unit 100 can use the device's microphones 74 as videoconferencing microphones. In this way, several of the participants can use the microphones 74 on their devices 50 as personal videoconference microphones, and the close proximity of each microphone 74 to each participant will likely offer high quality audio pickup for the videoconference. Additionally, the portable devices 50 can have high quality cameras 84, and the unit 100 can use the devices' cameras 84 as personal videoconference cameras in close proximity to the participants.

B. Portable Device

Figure 2:
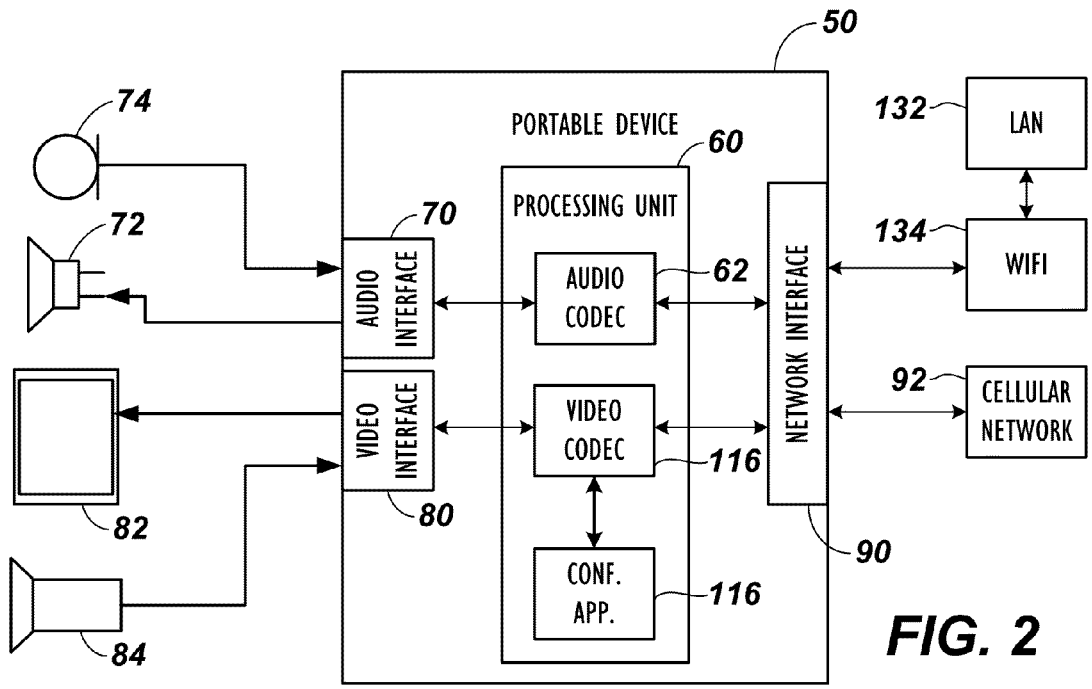
FIG. 2 schematically illustrates a portable device for use with the disclosed system.

Looking at a portable device 50 in more detail, FIG. 2 schematically illustrates an example of a portable device 50 for use with the disclosed system 10. For audio, the device 50 has a loudspeaker 72 and a microphone 74 coupled to an audio interface 70, while the device 50 has a display 82 and a camera 84 coupled to a video interface 80 for video. Internally, the portable device 50 has a processing unit 60 with an audio codec 62 and a video codec 64 respectively connected to the audio and video interfaces 70 and 80 for encoding and decoding the audio and video. Finally, the portable device 50 has a network interface 90 connected to the codecs 70 and 80 for communicating audio and video with the near-end unit (100) and far-end units (30).

In one type of connection, for example, the network interface 90 can connect to a typical cellular network 92 if the device 50 can be used for cellular communications. In another type of connection, the network interface 90 can connect to the LAN 132 via the wireless network 134 so the portable device 50 can communicate with the videoconferencing unit (100) or far-end (30). As one skilled in the art will appreciate, any other type of connection can be used to communicate between the portable device 50 and the videoconferencing unit (100). As will also be appreciated, establishing a connection between the portable device 50 and the videoconferencing unit (100) and far-end (30) requires particular protocols, applications, accounts, and other details that are pre-arranged for the connection to be possible so the details are omitted here.

C. User Interface

Figure 3:
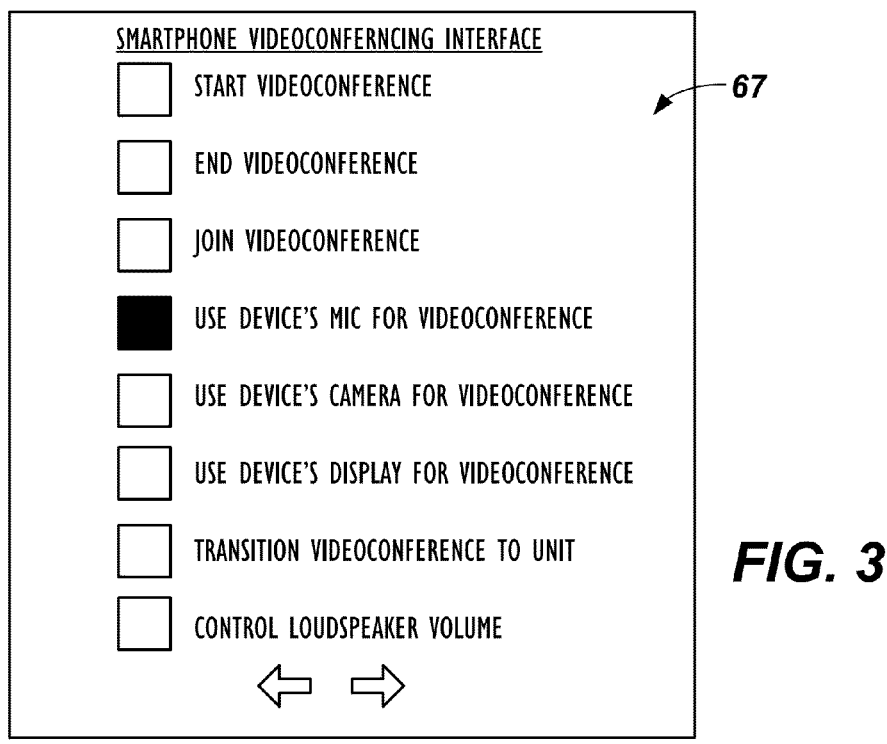
FIG. 3 shows a videoconferencing interface for the portable device.

To operate in conjunction with the videoconferencing unit (100) and optionally controlling the unit's functions, the portable device's processing unit 60 has a videoconferencing application 66 with a user interface. When operated, the application 66 allows a participant to use the portable device 50 as a peripheral to the videoconferencing system (10). FIG. 3 shows an example videoconferencing interface 67 for the portable device's application (66). Participants can use the portable device's interface 67 to operate in the videoconference system (10).

As shown in the example of FIG. 3, the user interface 67 has a number of user interface items available for the application (66). The items can include, but are not limited to, starting a videoconference, ending a videoconference, joining a videoconference, using the device's microphone 74 and/or camera 84 for the videoconference, transferring the videoconference from the portable device 50 to the unit 100 and visa-versa, and performing additional functions. Some of these additional functions can be similar to the typical functions available on a conventional remote control of a videoconferencing unit, such as controlling loudspeaker volume, moving cameras, changing display options, etc.

Some general discussion of the user interface items follows. By selecting to start a videoconference, for example, the portable device 50 can be used to initiate a videoconference as discussed herein. By selecting to join a current videoconference, the portable device 50 can become a peripheral device to the videoconferencing unit 100 currently conducting the videoconference. By selecting to use the device's microphone, camera, or display, the user can configure how the portable device 50 is to be used as a peripheral to the videoconferencing unit 100.

Finally, by selecting to send content, the user interface can allow the participant to send content from the portable device 50 to the videoconferencing unit 100 for incorporation into the videoconference. The content can include a video, an image, a document, a presentation, etc. that resides on the portable device 50. Thus, in this arrangement, the portable device 50 can act as a content or presentation device for the unit 100 and can have a video player, an image application, a document application, a presentation application, etc. for generating the content so the device 50 can send the content to the unit 100 through the network connection.

D. Videoconference Process

Figure 4A:
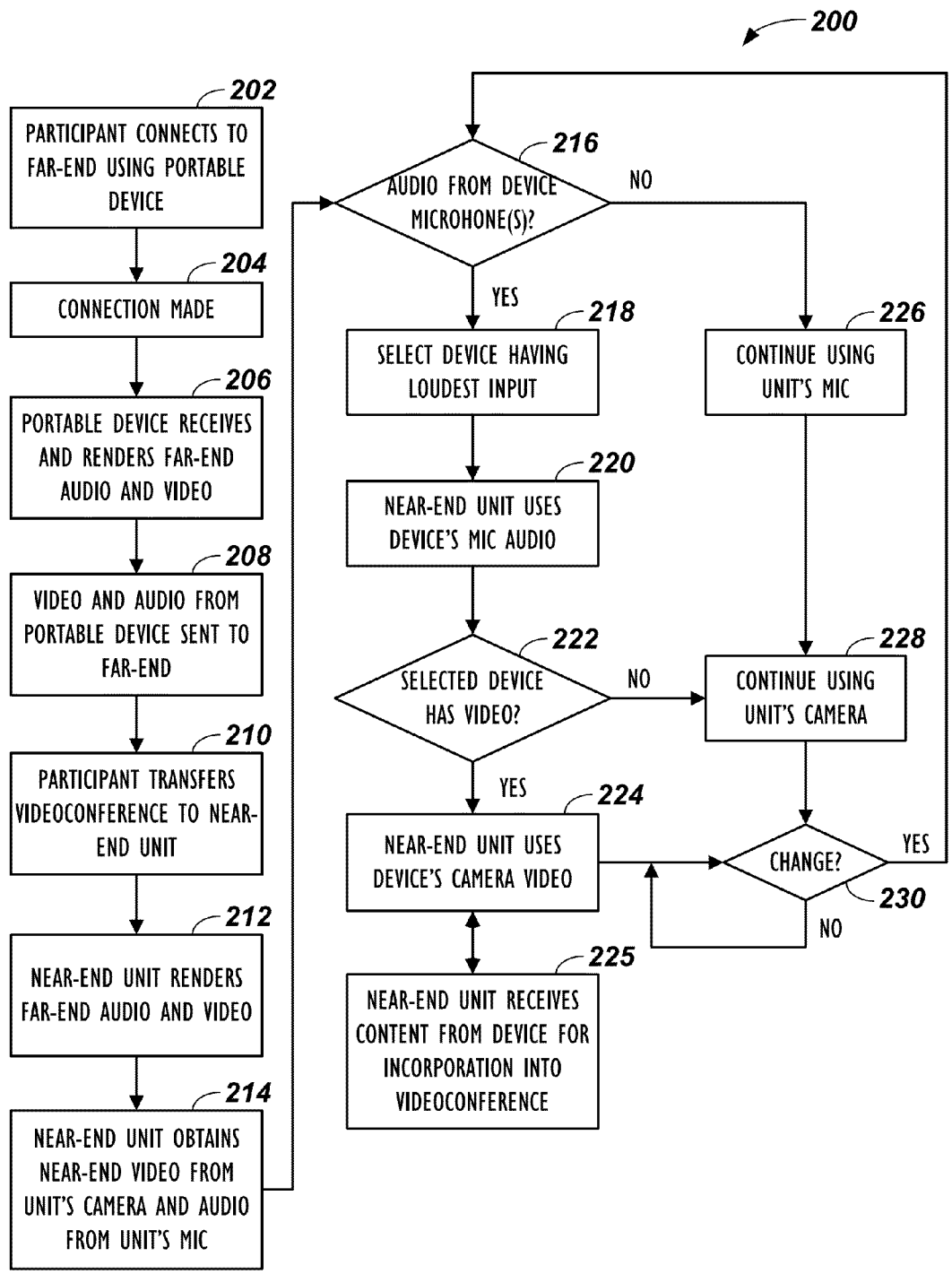
FIG. 4A illustrates a process for conducting a videoconference with the system of FIG. 1 when the portable device initiates the videoconference.

Having an understanding of the videoconferencing system 10, the videoconferencing unit 100, and the portable device 50, discussion now turns to how the portable devices 50 can be used with the videoconferencing unit 100 during a videoconference. As briefly hinted above, a participant can start a videoconference with a portable device 50 and can later transfer it to the videoconference unit 100. FIG. 4A illustrates a process 200 for conducting a videoconference with the system 10 of FIG. 1 (to which reference is concurrently made) when the portable device 50 initiates the videoconference.

To initiate the videoconference, a participant connects to the far-end 30 using their portable device 50 and the videoconferencing application 66 (Block 202). Any of the various network connections can be used to establish the videoconference. For example, the portable device 50 can connect via the Wi-Fi network 134 to the LAN 132 and then to the WAN (i.e., Internet) 136. If the portable device 50 has cellular functionality, then the videoconference can be established with a cellular telephone call as known in the art.

Once connected to the far-end 30 (Block 204), the portable device 50 receives and renders the far-end video and audio for output on the portable device 50 using its display 82 and loudspeaker 72 (Block 206). At this point, the portable device's existing camera 84 and microphone 74 can transmit video and audio to the far-end 30 as part of the videoconference (Block 208).

When desired, the participant selects to transfer the videoconference to the near-end videoconferencing unit 100 (Block 210). To transfer the videoconference, for example, the participant initiates the transfer by selecting an interface item on the device's conferencing application (66). The portable device 50 then transfers the videoconference connection details to the videoconferencing unit 100, and the videoconferencing unit 100 in response establishes its own videoconference connection with the far-end 30.

For example, the conferencing application 66 on the portable device 50 can have a "transfer" button for the participant to select on the user interface (67). (See FIG. 3.) When the transfer is selected, the user interface (67) can have a number of input screens for the participant to enter the IP address or other identifier of the far-end 30 so the videoconferencing unit 100 can establish the connection. Other details may also be entered in the user interface (67), such as passwords, connection information, participant tags, etc.

Once the transfer is completed and verified, the portable device 50 disables its connection with the far-end 30 so it will only use its local connection to the videoconferencing unit 100 for the videoconference. At this point, the unit 100 begins rendering the far-end video and audio with the higher quality processing available with the unit 100 (Block 212).

Now as the videoconference proceeds, near-end video processing switches from the portable device's camera 84 to the unit's higher quality camera 144, and the audio processing also switches from the device's microphone 74 to the unit's microphone 124 (Block 214). Yet, as noted herein, the portable device 50 remains paired in communication with the videoconferencing unit 100 via the network connection (e.g., Wi-Fi network and LAN) so the device 50 can be used for video and audio processing when chosen to do so. In other words, the device's microphone 74 can still be used to obtain the videoconference audio, and the device's camera 72 can be used to obtain videoconference video.

At the outset, however, audio and video processing may be handled by the videoconferencing unit 100 as shown in FIG. 4A. When the unit 100 is processing audio, the portable device's loudspeaker 72 can be muted so that it does not output audio during the videoconference, or the portable device 50 may simply not receive audio for output from the unit 100 via the local network connection.

At some point during the videoconference, the participant with the paired device 50 may speak, and the unit 100 and/or the device 50 monitors whether audio from the device's microphone 74 is obtained (Decision 216). In one implementation, the paired device 50 obtains audio with its microphone 74 and transmits this audio in its paired network connection to the videoconferencing unit 100 regardless of whether the participant with the paired device 50 is speaking. In turn, the videoconferencing unit 100 determines whether the microphone 74 is capturing active speaking by the participant. As an alternative, the paired device 50 obtains audio with its microphone 74, but does not send the audio to the unit 100 unless the device 50 determines there is active speaking.

In any event, if there is no device audio (either because none of the devices 50 is using its microphone 74 for audio or because none of the active device microphone 74 is capturing speech) (No-Decision 216), the unit 100 continues using its microphone 124 for audio capture (Block 226). Following on this, the unit 100 may still continue using its camera 122 for video capture as there may be no need to switch to video capture from a portable device 50 when a participant is not speaking (Block 228).

At some point in the videoconference, however, one of the devices 50 using its microphone 74 for audio pickup does obtain active speech audio from its participant, and the unit 100 uses this audio for the videoconference as detailed below (Yes-Decision 216). In using the audio, the videoconferencing unit's audio codec 112 encodes the microphone's audio as conference audio and sends the conference audio from the portable device 50 to the far-end 30. If several device microphones 74 (and possibly the unit's microphone 124) are concurrently capturing audio, then the unit 100 selects the microphone 74 or 124 having the loudest input (Block 218) and uses that device's audio for the videoconference audio (Block 220). This comparison may prevent the unit 100 from choosing a source of audio input in error. Any of the numerous techniques can be used for determining the acoustic energies of input audio and comparing them to find the strongest input audio.

If some of the participants do not have a portable device 50, the unit 100 can obtain conference audio from the existing microphone (124) (if available) or from the closest portable device's microphone 74 (presuming it is the loudest). In the end, the unit 100 does not necessarily need to know how many participants are present and how many have a portable device 50 capturing audio, although this could be useful and can be manually or automatically determined. At most, the unit 100 needs merely to select a microphone (whether one of the portable device's microphones 74 or the unit's existing microphone 124) having the loudest captured audio for input.

The device 50 from which audio is used may also have its camera 84 available for capturing video for the videoconference, and the unit 100 decides whether the device's camera 84 can capture video of the speaking participant for the videoconference (Decision 222). If not available (either because there is no camera 84 or it is not enabled), the unit 100 continues using its camera 122 for the conference video (Block 228). Otherwise, the unit 100 uses the video from the device's camera 84 for the videoconference (Block 224).

At any point during the process 200, the participant can elect to send content from the portable device 50 to the videoconferencing unit 100 for incorporation into the videoconference (Block 225). As noted above, the content can include a video, an image, a document, a presentation, etc. that resides on the portable device 50, and the portable device 50 can send the content through the network connection (e.g., wireless network 134 to the LAN 132) to the unit 100. In turn, the unit 100 can incorporate the content into the data sent to the far-end as part of the videoconference.

Depending on the capabilities of the portable device 50 and the type of content involved, the content can be sent as a data stream or in a data file to the unit 100. Additionally, the portable device 50 acting as a content or presentation device may or may not be capable of acting as a peripheral (i.e., capturing and sending audio and/or video from the device 50 to the unit 100), as this would depend on the processing capabilities of the device 50. All the same, the portable device 50 can be configured to send one or more of audio, video, and content to the unit 100 at any given time during the videoconference as configured by the participant.

The current processing arrangement may continue as long as the circumstances remain the same (Decision 230). At some point, the participant with the device 50 delivering audio (and optionally video) may stop speaking while the far end 30 starts speaking or another near-end participant speaks, the participant may disable the paired connection of the device 50 with the unit 100, the participant may leave the room with the device 50, or any other type of change may occur. Accordingly, the unit 100 will stop its processing arrangement and will return again to determining whether to use audio and video from a portable device 50 or from the videoconferencing unit 100 (Decision 216).

The scenario above has discussed how the portable device 50 can initiate the videoconference with the far-end 30 and then transfer it to the videoconferencing unit 100. In an alternative scenario, the videoconferencing unit 100 can initiate the videoconference and can begin rendering audio and video obtained with the conventional microphone(s) 124 and the unit's camera 144. Then, during the videoconference, participants with portable devices 50 can connect or pair with the videoconference unit 100 to join the videoconference.

Once the device 50 pairs with the unit 100, the participant can use the user interface application 66 to perform any of various functions, such as display the videoconference video with the portable device's display 82, reproduce the videoconference audio with the loudspeaker 72 or a headphone output, start and stop the videoconference, etc. More specifically, the paired device 50 can be used as a microphone and optional video peripheral during the videoconference as detailed herein.

Figure 4B:
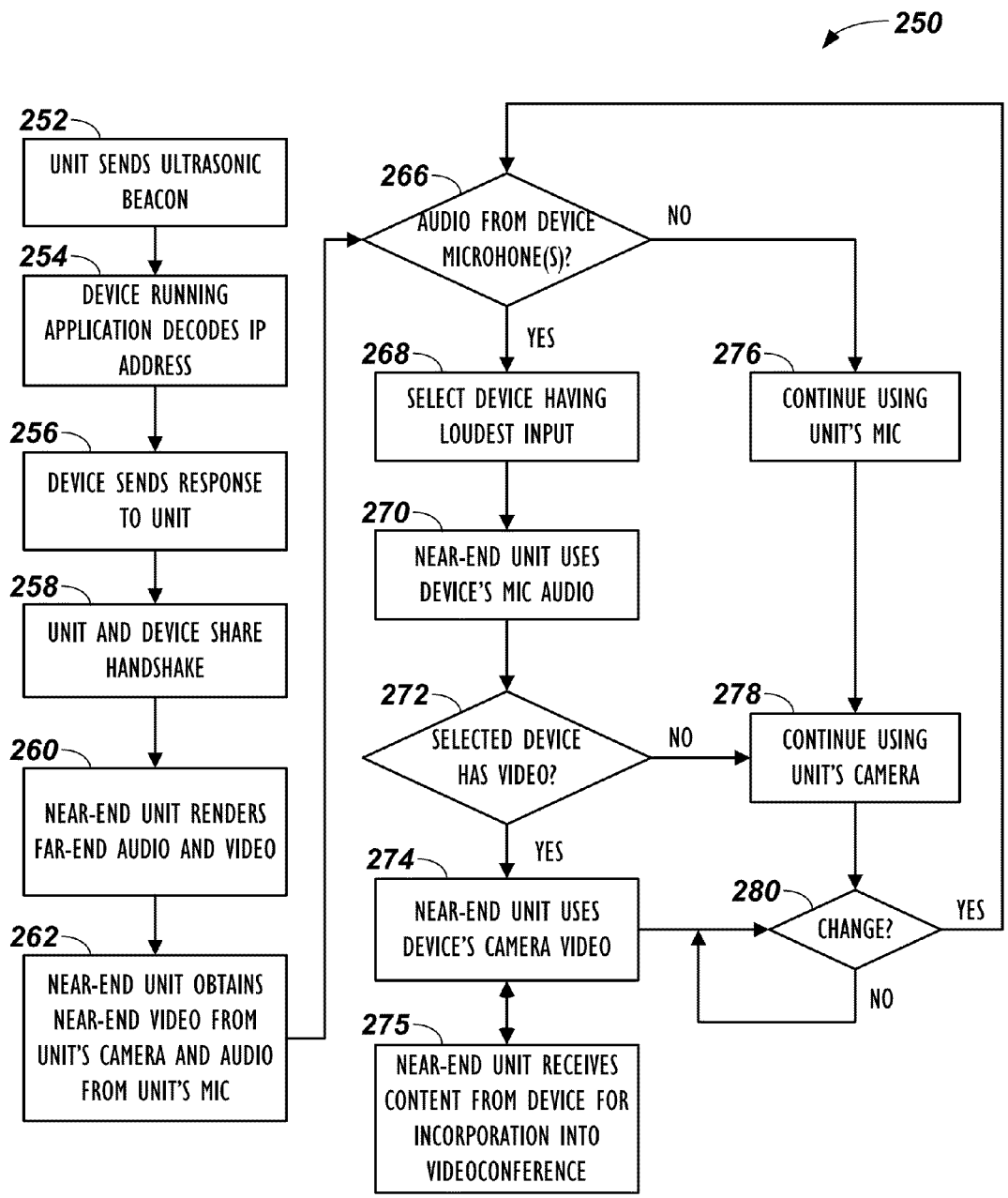
FIG. 4B illustrates a process for conducting a videoconference with the system of FIG. 1 when the portable device joins the videoconference in progress.

To that end, FIG. 4B shows a process 250 for a portable device 50 to join a videoconference as a peripheral to the videoconferencing unit 100 during a videoconference. Initially in the process 250 of FIG. 4B, the videoconferencing unit 100 repeatedly sends an ultrasonic beacon encoding its network (e.g., IP) address into the surrounding environment, as the unit 100 conducts the videoconference (Block 252). A participant in the room having a portable device 50 running a conferencing application (66) can select to join the videoconference conducted by the unit 100, and the device's application (66) decodes the IP address from the ultrasonic beacon (Block 254). Using the decoded IP address and wireless network (134) and LAN (132), the device 50 sends a response to the unit 100 to join the videoconference (Block 256), and the device 50 and unit 100 exchange a handshake to initiate the communication between them so the device 50 can be paired with the unit 100 (Block 258).

As the videoconference continues, the near-end unit 100 renders far-end audio and video (Block 260) and obtains near-end video from the unit's camera 144 and audio from the unit's microphone 124 (Block 262). Yet, when appropriate, the portable device's microphone 74 capturing audio can be used for the videoconference, and the device's camera 84 capturing video can also be used for the videoconference as already described.

From here on then, processing can continue as in the previous arrangement of FIG. 4A. As long as none of the portable devices 50 capture audio with the greatest level, then the unit 100 can continue using its microphone 124 and camera 144 to send to the far-end 30 (Block 276-278).

At some point, for example, one of the devices 50 using its microphone 74 for audio pickup obtains audio from its participant, and the unit 100 uses this audio for the videoconference as detailed below (Yes-Decision 266). If several device microphones 74 and 124 are obtaining audio, then the unit 100 selects the microphone 74 and 124 having the loudest input (Block 268) and uses that device's audio for the videoconference audio by sending the audio to the far-end 30 (Block 270).

When the portable device 50 used for audio has its camera 82 available for capturing video for the videoconference, the unit 100 decides whether the device's camera 82 can capture video for the videoconference (Decision 272). If not available, the unit 100 continues using its camera 122 (Block 278). Otherwise, the unit 100 accepts the video from the device's camera 82 for the videoconference (Block 274). Finally, at any point during the process 250, the participant can elect to send content from the portable device 50 to the videoconferencing unit 100 for incorporation into the videoconference in the same manner described previously (Block 275).

The current processing arrangement may continue as long as the circumstances remain the same (Decision 280). At some point, the participant at the device delivering audio (and optionally video) may stop speaking while the far-end 30 starts speaking or another participant speaks, and the unit 100 will return to determining whether audio and video should be captured with another portable device 50 or with the videoconferencing unit 100 (Decision 266).

The choice on whether to output video from a portable device 50 in the previous processes 200, 250 relied on whether the portable device 50 was being currently used to obtain input audio for the videoconference. In other words, if the portable device 50 is not selected for audio, then the device 50 would not be used for obtaining video in the previous processes 200, 250. Yet, other arrangements could be used so that a portable device 50 obtaining only video and not audio could be used to obtain video for the videoconference without obtaining audio.

E. Automatic Pairing

As noted above, a portable device 50 can automatically connect or pair with the videoconferencing unit 100 using ultrasonic pairing so the portable device 50 and videoconferencing unit 100 can communicate with one another through the network connection. As noted above, the videoconference unit 100 transmits an ultrasonic beacon encoding its network (IP) address using its loudspeaker 122, and this network (IP) address can be the unit's address in the local intranet.

Looking at the pairing in more detail, the ultrasonic beacon is preferably beyond of the audible range but low enough so conventional loudspeaker and microphone components can still have a useful signal response. Therefore, the frequency is preferably above 20 kHz. One acceptable frequency is 21 kHz. Since this frequency is above the human range of hearing, it cannot be heard during the videoconference. Additionally, the beacon purposely has a low volume when output.

Transmission of the network (IP) address and any other pertinent information in the beacon preferably uses an audio frequency-shift keying (AFSK) form of frequency modulation with the carrier signal of about 21 kHz. As noted above, the device 50 having a microphone 74 and running the peripheral conferencing application (66) detects the beacon, decodes the IP address based on the AFSK modulation, sends a response to the videoconferencing unit 100 via the network connections, and the two devices 50 and 100 share a handshake so the device 50 can be used in the videoconference.

The pairing can disconnect automatically when the device 50 leaves a room or is actively disconnected by the participant. The device 50 can then connect automatically to another videoconferencing unit when entering another room. Unlike Bluetooth technology, the ultrasound beacon can be limited to the environment (e.g., room) of the videoconference's unit 100 so there may be less chance of cross-interference between different videoconferencing units in a building causing incorrect pairing of devices 50 to the units 100. Thus, the ultrasonic pairing can allow the unit 100 to identify specifically that the device 50 is in the same environment as the unit 100 and not located somewhere else in a building.

Although the unit 100 is described as sending an ultrasonic beacon encoding its IP address, each of the devices 50 can do the same. Therefore, in a reverse pairing arrangement, the unit 100 detects an ultrasonic beacon from a portable device 50, decodes the device's IP address, and establishes the network connection with the portable device 50 based on the decoded IP address. Moreover, the portable devices 50 can pair with one another using their IP addresses encoded in ultrasonic beacons.

F. Echo Cancellation

As noted above, the portable device's microphone 74 can capture audio and transmit it through the network interface 90, wireless network 134, and LAN 132 to the videoconferencing unit 100 for sending to the far-end 30. At the same time during the videoconference, the videoconferencing unit's loudspeaker 122 outputs audio at the near-end for the videoconference environment. Because the portable device's microphone 74 and the unit's loudspeaker 122 are in the same environment, acoustic coupling can occur when the portable device's microphone 74 directly captures audio output by the loudspeaker 122. As is known, this acoustic coupling can cause an "echo" to be transmitted by the unit 100 to the far-end 30, and the far-end 30 will hear its own audio returned back to it at a delay. Therefore, the videoconferencing system 10 preferably attempts to reduce the detrimental effects of any acoustic coupling that may develop during the videoconference.

Figure 5:
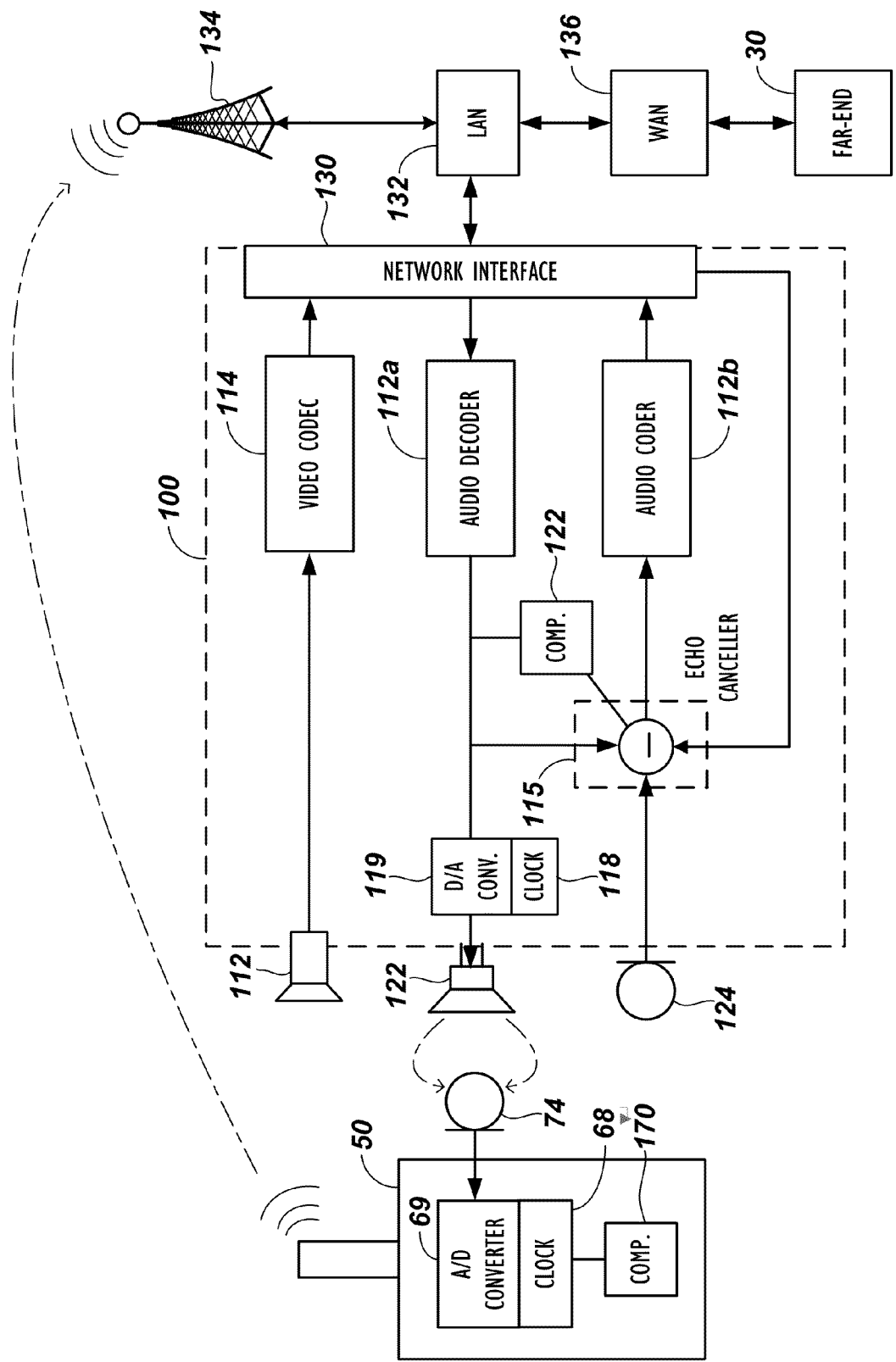
FIG. 5 schematically illustrates an echo-canceller for the videoconferencing unit and clocks for the videoconferencing unit and portable device of the system.

To that end, discussion turns to FIG. 5. As schematically shown and previously discussed, the videoconferencing unit 100 receives output audio from the far-end 30 via the network interface 130, and the audio codec's decoder 112a decodes the output audio for output by the unit's loudspeaker 122. To output the audio, a digital-to-analog converter 119 uses a sample rate conversion based on a clock 118 and converts the digital output to analog output, which the loudspeaker 122 then outputs to the environment. In turn, the portable device's microphone 74 captures audio in the environment. In capturing the audio, the portable device's analog-to-digital converter 69 uses a sample rate conversion based on another clock 68 and converts the analog input to digital input.

Some of the audio captured with the microphone 74 may be acoustically coupled from the loudspeaker 122. Nevertheless, the portable device 50 communicates the captured audio to the videoconferencing unit 100 via the network connection (e.g., Wi-Fi network, LAN, and the like). In turn, the unit's audio coder 112b encodes the input audio for sending to the far-end 30. If the audio were left alone, any acoustically coupled audio from the loudspeaker 122 to the microphone 74 would be sent via the network interface 130 to the far-end 30 as an "echo."

To deal with acoustic coupling and the resulting echo, the videoconferencing unit 100 has an echo canceller 115. Using any of the known echo cancellation techniques, the echo canceller 115 compares the input audio from the device's microphone 74 with the output audio for the loudspeaker 122 and attempts to remove the output audio from the unit's loudspeaker 122 that has been included in the input audio picked up via acoustic coupling between the loudspeaker 122 and the microphone 74. When functioning properly, the echo canceller 115 can reduce the chances that the far-end 30 will detect an "echo."

In most instances, the analog-to-digital (A/D) clock 68 for the portable device's microphone 74 is not matched in frequency to the digital-to-analog (D/A) clock 118 of unit's loudspeaker 122. The mismatched clocks 68 and 118 can result in poor performance of the acoustic echo cancellation. For proper cancellation, for example, the loudspeaker's D/A clock 118 and the microphone's A/D clock 74 need to be at the same frequency within a small variation (e.g., less than 1 parts per million (PPM)). Being on separate devices, however, the loudspeaker's and microphone's clocks 68 and 118 are controlled by physically separate crystals, and their frequencies may be off by 100 PPM or more.

G. Clock Compensation

To deal with the mismatched clocks 68 and 118, the system 10 uses a clock compensator 160 at the unit 100 and/or a clock compensator 170 at the portable device 50 so the echo canceller 115 on the unit 100 can more effectively remove echo caused by acoustic coupling between the unit's loudspeaker 122 and the device's microphone 74. To do this, the clock compensator 160, 170 compensates for the clock differences and improves the performance of the unit's echo canceller 115.

In one embodiment, the clock compensator 160 on the videoconferencing unit 100 assists in the echo cancellation. In particular, the clock compensator 160 cross-correlates an echo estimate of the far-end audio (being output by the unit's loudspeaker 122) and the near-end audio (being input from the device's microphone 74). Using the cross-correlated results, the compensator 160 then adjusts a sample rate conversion factor used for the echo cancellation analysis of the audio to be sent to the far-end 30. In this arrangement, the clock compensator 160 using the echo estimate can compensate for the differences in the clocks 68 and 118 without involving the portable device 50.

In another embodiment, the clock compensator 170 on the portable device 50 assists in the echo cancellation by determining a difference in the clocks 68 and 118. The difference is then used to "synchronize" the audio clocks 68 and 118 by adjusting the sample conversion rate of the portable device's microphone 74 or by adjusting the sample rate conversion for the unit's echo canceller 115 or the unit's loudspeaker 122.

As noted above, the portable device 50 pairs with the unit 100 by obtaining the unit's IP address in an ultrasonic beacon emitted by the unit's loudspeaker 122. This ultrasonic beacon is preferably transmitted with a carrier signal with an ultrasonic frequency of 21 kHz, for example. After capturing the beacon, the portable device 50 uses the frequency of the ultrasonic carrier signal to determine the frequency difference between the clock 68 for its microphone 74 and the clock 118 for the unit's loudspeaker 122.

For example, the unit 100 emits the ultrasonic beacon as noted above at a pre-determined frequency at 21,000 Hz using the loudspeaker 122. The microphone 74 on the portable device 50 captures the ultrasonic beacon, and the compensator 170 measures the beacon's frequency relative to the device's A/D clock 68. In general, the measured frequency will differ from the beacon's pre-determined frequency (21 kHz) due to the different frequencies of the separate clocks 68 and 118. By way of example, the microphone's clock 68 may be about 1 percent slower than the loudspeaker's clock 118. In this case, the compensator 170 will measure the frequency of the beacon as 21,210 Hz (i.e., 21,000×1.01).

Despite this measured difference, the portable device 50 with the microphone 74 and conferencing application (66) knows that the actual frequency of the beacon should be the predetermined 21,000 Hz. Therefore, the compensator 170 can deduce that the clock frequency difference is 210 Hz (i.e., 21,210 Hz−21,000 Hz). Once the frequency difference is known to within an acceptable deviation (e.g., 1 PPM), the portable device 50 can use re-sampling algorithms and can adjust the microphone 74's sample rate conversion to match the loudspeaker 122's sample rate conversion. In this way, the A/D converter 69 based on the device's clock 68 can having its sample conversion rate match that of the D/A converter 119 based on the unit's clock 118. Once the rates match, the echo canceller 115 on the unit 100 can operate more effectively.

The reverse is also possible where the loudspeaker's sample rate conversion is adjusted. For example, the portable device 50 can send the determined frequency difference to the unit 100 via the network connection. In turn, the compensator 160 of the unit 100 can use re-sampling algorithms and can change the loudspeaker 126's sample rate conversion used for outputting audio so it will match the microphone 74's sample rate conversion. Alternatively, the compensator 160 can use this determined difference in the sample rate conversion of the echo cancellation so the echo canceller 115 can operate more effectively.

In a further alternative, the portable device 50 may not actually calculate the frequency difference. Instead, the portable device 50 communicates its audio capture frequency of its microphone 74 responding to the ultrasonic beacon to the videoconferencing unit 100 using the network connection. Then, the videoconferencing unit 100 can calculate the frequency difference between the predetermined carrier signal frequency and the audio capture frequency communicated to it from the portable device 50. Thus, the procedures discussed above would apply to the unit's processing instead of the device's processing.

In the current example, only the audio between one portable device 50 and the unit 100 has been discussed. In general, however, there can be any number of devices 50 in the room, and each can have its own A/D converter 69 and clock 68 for its microphone 74. These devices 50 can send their digital audio streams to the videoconference unit 110 via the wireless connection, and some of these streams may contain output audio from the loudspeaker 122 that has been acoustically coupled to the devices' microphone 74. The teachings above can be applied to the audio of each of these portable devices 50 as well.

H. Mobile Group Videoconferencing

Figure 6:
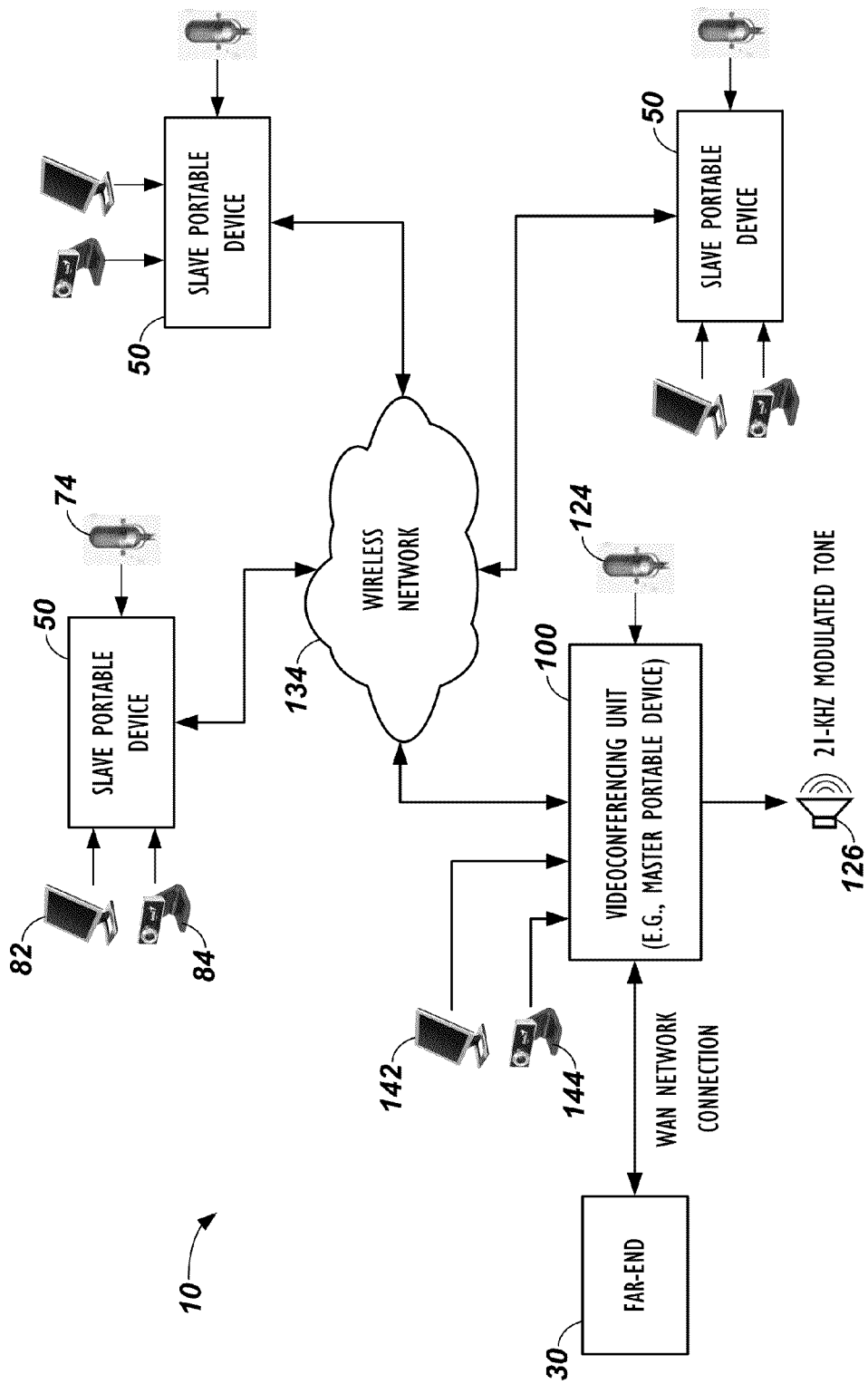
FIG. 6 schematically illustrates a mobile group videoconferencing arrangement according to the present disclosure having a master portable device and one or more slave portable devices.

With the ability to acoustically pair portable devices and adjust for clock differences as described above, the teachings of the present disclosure allow a mobile group of people, such as business travelers, students, co-workers, etc., to have a high quality group video conference with a far-end by using their laptops, smart phones, or other portable devices. In particular, FIG. 6 schematically illustrates a mobile group videoconferencing system 10 according to the present disclosure, which is similar to that shown in FIG. 1 so that discussion provided above is incorporated here. Again, the system 10 has several grouped devices 50 and 100 that participate as a group in a videoconference with a far-end 30.

In the system 10, one device 100 is designated as a "master" device, meaning that it essentially acts as a videoconferencing unit for the mobile group videoconference at the near-end. For example, the master device 100 can be a portable device, such as a laptop, that operates as the videoconferencing unit for the system 10 (i.e., acts as the controller/far-end audio renderer for the mobile group videoconference). In addition to network interfaces and other common components, the master device 100 can have a microphone 124, a display 142, and a camera 144—each of which can be integrated components of the device 100.

The other devices 50 in the mobile group videoconference are designated as "slave" devices, meaning that they do not control aspects of the system 10 at the near-end, although they could be configured to do so. These slave devices 50 are also portable devices, such as those already noted above. The actual video call to the far-end 30 is handled by the master device 100. Besides network interfaces and other common components, the slave devices 50 can each have a microphone 74, a display 84, and a camera 84. For their part, the slave devices 50 receive and transmit video/audio only to and from the master device 100. In this way, the master device 100 operates like a multipoint control unit. Notably, although one device 100 is described as the master device, it will be appreciated with the benefit of the present disclosure that any of the devices 50 and 100 can be the master device and that what device 50 or 100 is the master device can be configured and changed during the videoconference depending on the dynamics of the group. Once the designation of master device has been changed, all of the various teachings disclosed herein for master and slave devices can be adjusted based on the new designation.

As shown in FIG. 6, participants bring their portable devices 50 and 100 to a central meeting place, which can be any location having a local area network (LAN) with a wireless network, such as a Wireless Fidelity (Wi-Fi) network. As with the previous system 10 of FIG. 1, the group mobile videoconferencing system 10 uses the wireless network 134 (e.g., Wi-Fi network) of the local area network (LAN) in the group's environment to connect the devices 50 and 100 together. The master device 100, for example, connects with the other portable devices 50 via the Wi-Fi network 134. Only the master device 100, however, communicates with the far-end 30 via a Wide Area Network (WAN) connection, such as the Internet.

As discussed below, communication between the portable devices 50 and 100 can use the wireless network 134 to send audio, video, and other data between the devices 50 and 100. It will be appreciated that more than one wireless network 134 can be used at the same time depending on the capabilities of the devices 50 and 100 and the data to be communicated. Accordingly, when reference is made herein to audio, video, and data being sent between the devices 50 and 100 using a wireless network 134, such as a Wi-Fi network, it will be appreciated that any number of other wireless or even wired networks can be used at the same time for such purposes. Moreover, the various network connections discussed herein may share one or more of the same networks in connecting the devices 50 and 100 together and with the far-end 30.

Because most portable devices have poor quality loudspeakers, a USB-powered loudspeaker 126 can be used for rendering far-end audio for the group, although any type of loudspeaker can be used, including an independently powered and wireless loudspeaker unit. As shown, the loudspeaker 126 connects to the master device 100 responsible for rendering far-end audio for output with the loudspeaker 126 during the group videoconference. However, if one of the portable devices 50 or 100 has a loudspeaker (not shown) with sufficient quality, that loudspeaker could be used for the videoconference audio. In general then, the "master" device 100 can render the far-end audio via its internal loudspeaker (not shown) or via the external USB-powered loudspeaker 126, or it can send the far-end audio to one of the slave devices 50 for actual output.

Figure 7:
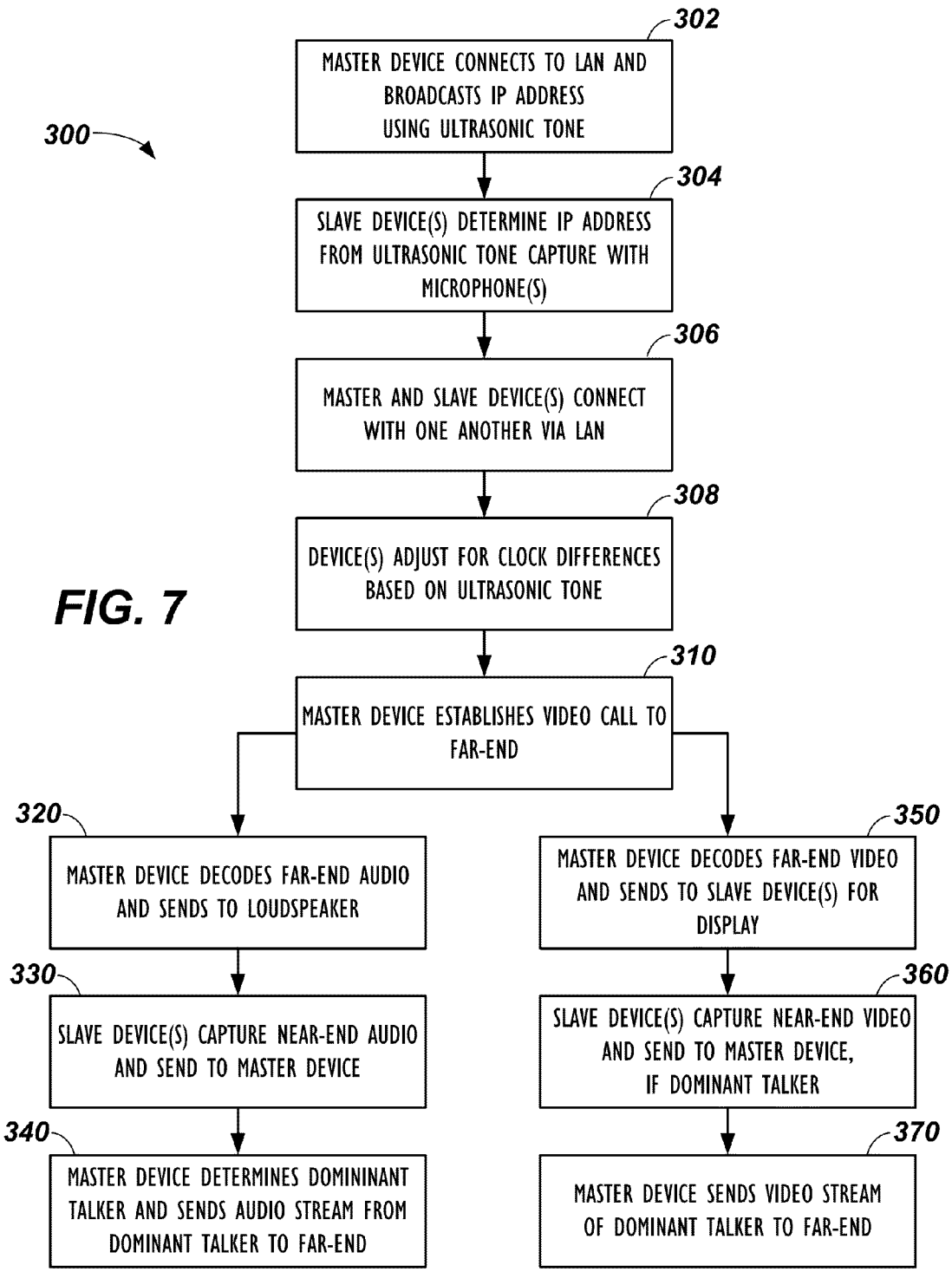
FIG. 7 illustrates a process for conducting a mobile group videoconference with the system of FIG. 6.

The set up and subsequent audio and video handing of the mobile group videoconferencing system are shown in the flow chart process 300 of FIG. 7, which is referred to concurrently herewith. To start a mobile group videoconference, the user at the master device 100 connects to the LAN via a Wi-Fi connection and then initiates mobile linkages to the other portable devices 50 in the group (Block 302). To do this, a videoconferencing application, such as a desktop videoconferencing application, operating on the master device 100 initiates mobile linkages with the other portable devices 50 in the group. Using an ultrasonic beacon (e.g., at 21-kHz) output by the master device 100 with the loudspeaker 126, for example, the master device 100 broadcasts its network (e.g., IP) address designated in the local area network to the other portable devices 50, which use the address to connect (i.e., pair) with the master device 100.

Details of this automatic acoustic pairing process are outlined above with reference to section E. Briefly restated here for completeness, the slave devices 50 in the pairing process capture the ultrasonic beacon with their microphones 74 and determine the network (IP) address of the master device 100 from the ultrasonic beacon (Block 304). The master and slave devices 50 and 100 then connect with one another via the LAN and Wi-Fi (Block 306). As noted above, the master device 100 emits a 21-kHz beacon via the loudspeaker 126. The beacon is modulated, using FSK (Frequency Shift Keying) for example, to carry the network address of the master device 100. In turn, the slave devices 50 receive the 21-kHz modulated beacon via their microphones 74. They demodulate the beacon to determine the network address of the master device 100. After learning the network address, the slave devices 50 "handshake" with the master device 100 with an exchange of network messages to establish two-way data transfer between the devices 50 and 100 via the Wi-Fi network and LAN. This process can preferably use a validation or verification process.

As also outlined above with reference to section F, the ultrasonic beacon also serves to synchronize the portable audio clocks of the devices 50 and 100 together for good acoustic echo cancellation. Briefly restated here for completeness, each device 50 and 100 measures the difference between the frequency of the received 21-kHz beacon and the precise 21-kHz carrier signal expected. This difference in frequency thereby reflects the difference in audio clock frequency of the master device's loudspeaker 126 and the audio clock frequency of device's microphone. Using this difference, the devices 50 and 10 can adjust for clock differences in subsequent processing of audio using any of the various adjustments discussed above (Block 308). As noted below, for example, the devices 50 and 100 can use a resampling algorithm to effectively alter the devices' audio clock frequencies to match that of the group loudspeaker 126's audio clock frequency, which helps with acoustic echo cancellation.

With the devices 50 and 100 in the group linked together and the audio clocks synchronized, the devices 50 and 100 can now use the local Wi-Fi network 134 to transfer video and audio data between the devices 50 and 100 during the mobile group videoconference. Thus, the user at the master device 100 establishes the videoconference connection with the far-end 30 via a WAN connection, such as the Internet (Block 310). In general, however, the master device 100 can establish the videoconference connection before or after pairing with the slave devices 50.

As the videoconference is then conducted, the main device 100 handles its own audio captured by its microphone 124 and handles output of videoconference audio to the group loudspeaker 126. For its part, each of the slave devices 50 handles its own audio captured by its microphone 74. Yet, the main device 100 controls the rendering of far-end audio at the near-end and controls the communication of near-end audio to the far-end 30.

In particular, the master device 100 receives the far-end audio from the far-end 30 via the device's network interface (not shown), decodes the far-end audio, and sends the decoded audio signal to its own internal loudspeaker (not shown), to the external USB loudspeaker 126 if used, or to one of the slave devices 50 if its internal loudspeaker is used (Block 320). At the same time, the master device 100 captures near-end audio with its microphone 124 for possible use as near-end audio for sending to the far-end 30. For their part, the slave devices' microphones 74 each pick up near-end audio of any local talker during the videoconference, and the slave devices 50 send the captured audio to the master device 100 for possible use as near-end audio for sending to the far-end 30 (Block 330). To ultimately handle the near-end audio, the master device 100 determines which microphone 74 or 124 of the devices 50 or 100 has captured audio of a dominant talker at the near-end and sends the audio stream from that source to the far-end 30 (Block 340).

Additionally, as the videoconference is conducted, the main device 100 likewise handles its own video captured by its camera 144 and handles output of videoconference video to its own display 142. On the other hand, each of the slave devices 50 handles its own video captured by its camera 84 and handles output of videoconference video to its own display 82. Yet, the main device 100 controls the rendering of far-end video at the near-end and controls the communication of near-end video to the far-end.

In particular, the master device 100 receives the far-end video from the far-end 30 via the device's network interface (not shown), decodes the far-end video, and sends the decoded video signal to the slave devices 50 for display (Block 350). At the same time, the master device 100 captures near-end video with its camera 144 for possible use as near-end video for sending to the far-end 30. For their part, the slave devices' cameras 84 each capture near-end video and send the captured video to the master device 100 (Block 360).

Preferably, a given slave device 50 does not send its captured video unless that particular device 50 has the dominant talker, but the system 10 may allow for any desirable form of sending video regardless. To ultimately handle the near-end video, the master device 100 preferably sends only the video stream of the dominant talker (from the device 50 or 100 determined to be so) to the far-end 30 (Block 370). In other arrangements, however, the master device 100 can send video from more than one of the devices 50 and 100 to the far-end 30 at the same time—e.g., using composite video techniques.

1. Slave Audio Handling

Figure 8:
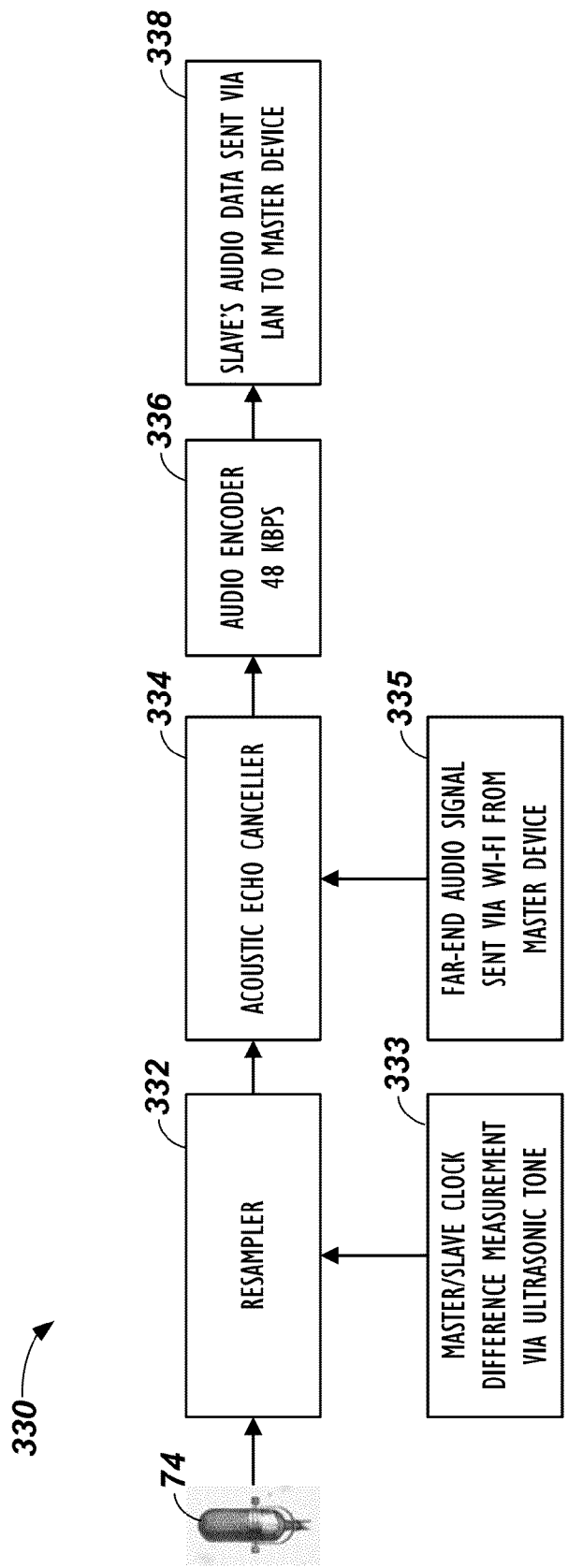
FIG. 8 illustrates audio handling by a slave device in the mobile group videoconference.

Further details of the audio handling (330: FIG. 7) by a slave device 50 in the mobile group videoconference are shown in FIG. 8. During the videoconference, the slave device 50 determines, obtains, or receives the clock difference 333 between the audio capture frequency of its microphone 74 and the audio output frequency of the group loudspeaker 126. As noted above, the clock difference 333 is determined using the ultrasonic beacon.

Having this, a resampler 332 uses the clock difference 333 in an algorithm to resample the audio signal captured with the device's microphone 74. By resampling in this manner, the captured audio's sampling frequency can effectively match that of the loudspeaker reference signal.

In the processing, the slave device 50 also receives an echo cancellation reference signal 335 of the far-end audio, which has been sent via the Wi-Fi network from the master device 100 (See FIG. 9A). The slave device 50 uses a decoder of a low distortion audio codec, and an acoustic echo canceller 334 receives both the far-end reference signal 335 and the device's resampled audio from the resampler 332. Performing echo cancellation on the resampled audio, the echo canceller 334 seeks to eliminate any acoustically coupled audio of the loudspeaker 126's output from the input audio captured by the device's microphone 74 so that the slave device's captured audio will not produce an echo if sent to the far-end 30. The output of the echo canceller 334 goes to an audio encoder 336, which can use Siren14 at 48 kbps, for example, and the encoded audio data 338 is finally sent via the Wi-Fi network 134 to the master device 100 for possible use as the near-end audio to be sent to the far-end 30. With the benefit of the present disclosure, it will be recognized that some or all of this audio processing can be done at the master device 100 on behalf of the slave device 50.

2. Master Audio Handling

Further details of the audio handling (320 & 340: FIG. 7) by the master device 100 are shown in FIGS. 9A-9B. As shown in FIG. 9A, far-end audio received via the network interface 130 is decoded and sent to the loudspeaker 126 for output to the mobile group (Block 320). Additionally, as shown in Block 335, the master device 100 also sends the decoded far-end audio to the slave devices 50 via the Wi-Fi network 134 to be used as an echo cancellation reference signal at the slave devices 50 (See 335 in FIG. 8). As discussed herein, the loudspeaker 126 has its own D/A clock (not shown), which may have a different sampling frequency compared to the A/D clocks (not shown) of the various microphones 74 and 124 of the devices 50 and 100 in FIG. 6. This difference and its effect on acoustic echo cancellation are resolved using the clock compensation techniques discussed herein.

As shown in FIG. 9B, the audio captured by the master device's microphone 124 is first resampled so that its sampling frequency effectively matches that of the loudspeaker's reference signal. If the loudspeaker used is an external USB device (e.g., loudspeaker 126 of FIG. 6), there will be a significant clock difference. If the loudspeaker is internal to the master device 100, however, the clock difference would likely be negligible. Next, the signal goes through an acoustic echo canceller 344 to eliminate any of the loudspeaker's acoustically-coupled component from the audio signal captured from the microphone 124.

Output of the echo canceller 344 goes to an audio encoder 346, such as Siren14 at 48 kbps. At this point, the master device 100 can just mix all of the captured audio of the devices 50 and 100 for sending to the far-end 30.

Preferably, the audio streams from the devices 50 and 100 are sent to a dominant talker module 348. Rather than just mixing all of the audio signals from the various microphones on the portable devices 50 and 100 for the videoconference audio, the dominant talker module 348 uses energy of the near-end audio bit stream (346) from the master device 100 and the bit streams (338) from the slave devices 50 to determine which of the compressed bit streams is of a dominant talker in the mobile group. After comparing the energy levels and finding the one with an increased energy level, the dominant talker module 348 passes the dominant talker's compressed bit stream to the master device's network interface 130 and eventually to the far-end 30.

3. Video Handling by Slave Device

Figure 10A:
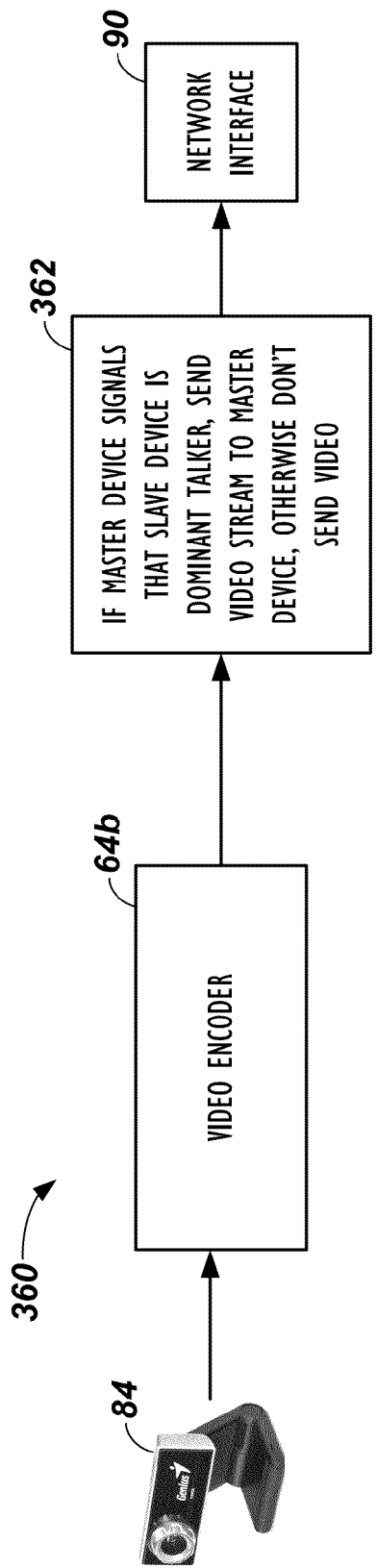
FIGS. 10A-10B illustrate video handling by a slave device in the mobile group videoconference.
Figure 10B:
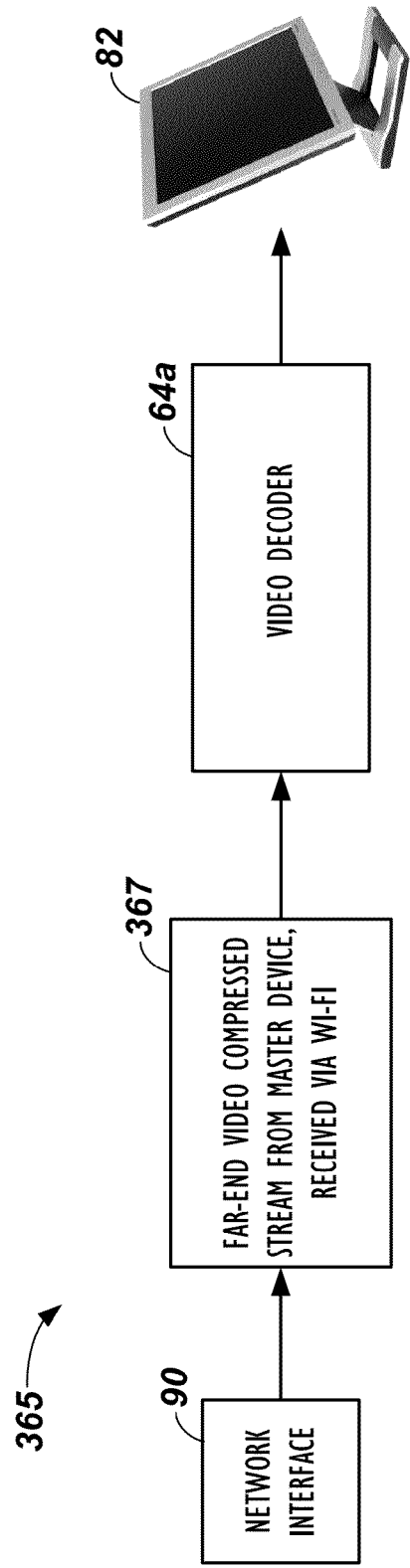

Details for video handling (360 & 365: FIG. 7) by a slave device 50 in the mobile group videoconference are shown in FIGS. 10A-10B. As shown in the video capture 360 of FIG. 10A, the slave device's video from its camera 84 is encoded by a video encoder 64b. During the videoconference, the master device 100 can signal to the slave device 50 that the slave device 50 has the current dominant talker. This can be a control signal sent via the Wi-Fi connection and LAN. Accordingly, the slave device 50 may only send the encoded video to the master device 100 if the master device 100 has indicated that the dominant talker is associated with the slave device 50 (Block 362). If this is the case, the encoded video data is sent via the network interface 90 to the master device 100 via the Wi-Fi network 134. In other arrangements, the slave device 50 may just sent its video to the master device 100.

As shown in the video rendering 365 of FIG. 10B, the slave device's network interface 90 receives the far-end's compressed video stream form the master device 100 via the Wi-Fi network 134. In turn, the device's video decoder 64a decodes the stream for rendering to the device's display 82.

4. Video Handling by Master Device

Figure 11:
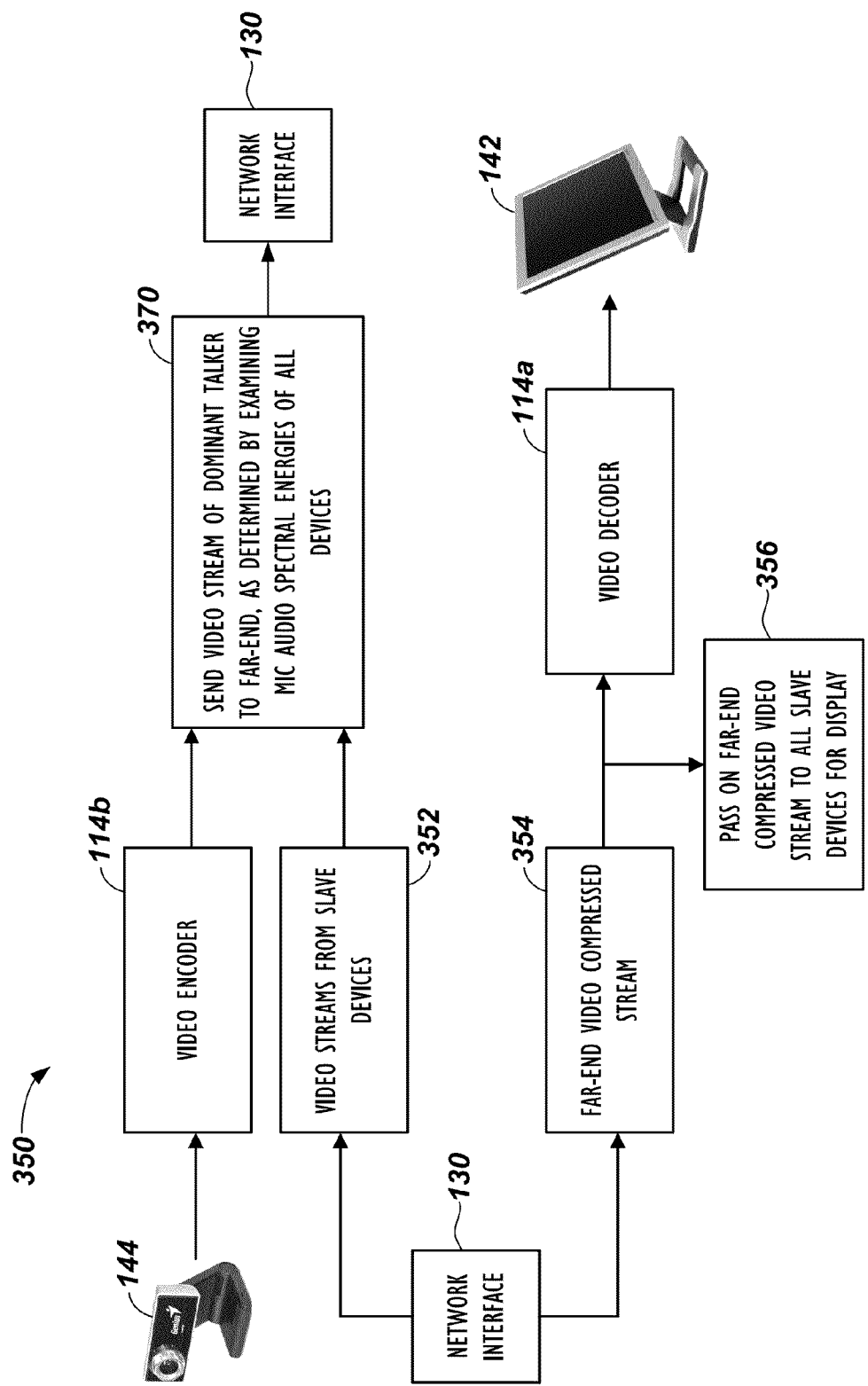
FIG. 11 illustrates video handling by the master device in the mobile group videoconference.

Finally, the video handling (350: FIG. 7) by the master device 100 in the mobile group videoconference is shown in FIG. 11. For video capture, a video encoder 114b receives video from the master device's camera 144. Additionally, if video streams are communicated from one or more of the slave devices 50 to the master device 100, they are received from the network interface 130. With these video streams, the master device 100 sends the video stream of the dominant talker to the far-end 30 (Block 370). As noted above, the dominant talker is determined by examining the audio spectral energies of all the devices 50 and 100 and picking the greatest as the dominant talker. Based on examination of these spectral energies of the audio from the various slave devices' microphones, the master device 100 therefore decides which slave device 50 is associated with the dominant talker, instructs that slave device 50 to send its video stream (352) to the master device 100, and the video stream (352) is passed on to the far-end 30. Of course, if the master device 100 has the dominant talker, then the master device's video stream is sent to the far-end 30 via the network interface 130 instead.

If network communications (e.g., network traffic, loss packet handing, etc.) and the master device's capabilities (e.g., buffering, data handling, processing, etc.) can accommodate transferring all of the video streams (352) from the slave devices 50 to the master device 100, then the master device 100 can forego instructing just one slave device 50 having the dominant talker to send its video stream (352) to the master device 100 while the other slave devices 50 hold off sending their video stream (352). Instead, having all of the video streams (352) available, the master device 100 can determine the dominant talker and send the corresponding device's video stream (352) onto the far-end 30. This may avoid some delays in the video handling and may allow the master device 100 to more quickly switch from one device's video stream to another. Of course, any other improvements dealing with latency or other delays in the video handling can be used in the system 10.

Moreover, the video handling by the master device 100 may designate one or more of the video streams from the devices 50 and 100 as default video. Thus, if there is no active talker in the group at the near-end, the master device 100 can sends its captured video stream (or the video stream from one of the other devices 50) to the far-end 30 by default.

For video rendering, the master device 100 also receives the far-end video compressed stream 354 via the network interface 130 and passes it on to all of the slave devices 100 for local display (356). Likewise, the compressed stream 354 is also decoded by the master device's video decoder 114_a_ for output to the device's display 142. Finally, it is also possible that, depending on the dynamics of the videoconference, the master device 100 can send any of the video steams (352) from one or more of the slave devices 50 to the other slave devices 50 and to the master's video decoder 114_a_ in addition to or instead of the far-end video compressed stream (354).

As will be appreciated, a programmable storage device can have program instructions stored thereon for causing a programmable control device to perform the teachings of the present disclosure. Accordingly, teachings of the present disclosure can be implemented in digital electronic circuitry, computer hardware, computer firmware, computer software, or any combination thereof. Teachings of the present disclosure can be implemented in a computer program product tangibly embodied in a machine-readable storage device for execution by a programmable processor so that the programmable processor executing program instructions can perform functions of the present disclosure. The teachings of the present disclosure can be implemented advantageously in one or more computer programs that are executable on a programmable system including at least one programmable processor coupled to receive data and instructions from, and to transmit data and instructions to, a data storage system, at least one input device, and at least one output device. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A conferencing method, comprising:
    connecting, in a near-end connection, a first grouped device with one or more second grouped devices in a group, the first and second grouped devices being in a same near-end environment as one another;
    connecting, in a far-end connection, the first grouped device with a far-end outside the near-end environment;
    receiving, at the first grouped device via the far-end connection, far-end audio from the far-end;
    sending the far-end audio to at least one loudspeaker associated with the group in the same near-end environment;
    receiving near-end audio at the first grouped device from microphones associated with the group in the same near-end environment; and
    sending, from the first grouped device to the far-end via the far-end connection, the near-end audio of at least one of the microphones.

2. The method of claim 1, wherein receiving the near-end audio at the first grouped device from the microphones associated with the group comprises one or more of:
    receiving, via the near-end connection, the near-end audio from one of the microphones associated with one of the one or more second grouped devices; and
    receiving near-end audio form one of the microphones associated with the first grouped device.

3. The method of claim 1, wherein connecting, in the near-end connection, the first grouped device with the one or more second grouped devices in the group comprises:
    outputting connection information in an acoustic beacon with the at least one loudspeaker associated with the group; and
    connecting the first grouped device via the near-end connection with the one or more second grouped devices based on the one or more second grouped devices responding to the output connection information in the acoustic beacon.

4. The method of claim 3, wherein outputting the connection information in the acoustic beacon comprises encoding the connection information in the acoustic beacon with frequency-shift keying.

5. The method of claim 3, wherein the connection information comprises a network address of the first grouped device used for the near-end connection in a near-end network.

6. The method of claim 3, wherein the acoustic beacon is ultrasonic.

7. The method of claim 1, further comprising outputting an acoustic beacon with the at least one loudspeaker, the acoustic beacon being based on a predetermined carrier frequency.

8. The method of claim 7, further comprising determining a frequency difference between an audio output frequency used by the at least one loudspeaker to output the acoustic beacon and an audio capture frequency used by one of the microphones used to capture the acoustic beacon.

9. The method of claim 8, wherein determining the frequency difference comprises calculating a difference between the predetermined carrier frequency and a measured carrier frequency of the acoustic beacon after output at the audio output frequency and after capture at the audio capture frequency.

10. The method of claim 8, further comprising one of:
adjusting the audio capture frequency of the one microphone based on the frequency difference;
resampling the near-end audio captured at the audio capture frequency with the one microphone based on the frequency difference; and
adjusting the audio output frequency of the at least one loudspeaker based on the frequency difference.

11. The method of claim 8, wherein the one microphone is associated with the first grouped device or one of the one or more second grouped devices.

12. The method of claim 1, further comprising:
receiving, at one of the one or more second grouped devices via the near-end connection, the far-end audio sent from the first grouped device;
capturing near-end audio with one of the microphones associated with the one second grouped device; and
removing a presence of the received far-end audio from the captured near-end audio.

13. The method of claim 1, wherein the first and second grouped devices are selected from the group consisting of a portable device, a peripheral device, a cellular telephone, a smartphone, a personal computing tablet, a personal digital assistant, a hand-held computer, a netbook computer, and a laptop computer.

14. The method of claim 1, wherein:
the far-end connection comprises an Ethernet connection, a Wide Area Network (WAN) connection, a wireless connection, an Internet connection, a cellular connection, a Plain Old Telephone Service (POTS) connection, or a combination thereof; and
the near-end connection comprises a Local Area Network (LAN) connection, an intranet connection, a Wireless Local Area Network (WLAN) connection, a Personal Area Network (PAN) connection, a Wireless Fidelity (Wi-Fi) connection, a wireless connection, or a combination thereof.

15. The method of claim 1, further comprising:
receiving, via the far-end connection, far-end video at the first grouped device from the far-end;
sending, via the near-end connection, the far-end video to the one or more second grouped devices;
receiving near-end video at the first grouped device from at least one of a plurality of cameras associated with the group; and
sending, via the far-end connection, the near-end video of the at least one of the plurality of cameras from the first grouped device to the far-end.

16. The method of claim 15, wherein receiving the near-end video at the first grouped device from the at least one of a plurality of cameras associated with the group comprises at least one of:
obtaining first video with a first of the cameras associated with the first grouped device; and
receiving, via the near-end connection, second video from one of the cameras associated with one of the one or more second grouped devices.

17. The method of claim 1, wherein sending, from the first grouped device to the far-end via the far-end connection, the near-end audio of the at least one microphone comprises:
determining which audio signal from the plurality of microphones is indicative of a dominant talker; and
sending only the audio signal from the microphone determined to be indicative of the dominant talker to the far-end.

18. The method of claim 17, further comprising:
receiving near-end video at the first grouped device from a plurality of cameras associated with the group; and
sending, via the far-end connection, the near-end video of at least one of the plurality of cameras from the first grouped device to the far-end, the sent near-end video of the at least one camera being associated with the first or second grouped device having the audio signal indicative of the dominant talker.

19. The method of claim 1, wherein connecting, in the near-end connection, the first grouped device with the one or more second grouped devices and connecting, in the far-end connection, the first grouped device with the far-end comprises:
connecting, in the far-end connection, one of the second grouped devices initially with the far-end;
connecting the one second grouped device in the near-end connection to the first grouped device; and
transferring the far-end connection from the one second grouped device to the first grouped device.

20. A programmable storage device having program instructions stored thereon for causing a programmable control device to perform a method of claim 1.

21. A first grouped device in a group at a same near-end environment with at least one second grouped device, the first grouped device comprising:
one or more network interfaces communicatively connecting to the at least one second grouped device via a near-end connection and communicatively connecting to a far-end outside the near-end environment via a far-end connection; and
a processing unit communicatively connected to the one or more network interfaces and configured to:
receive far-end audio from the far-end via the far-end connection,
send the far-end audio to at least one loudspeaker associated with the group in the same near-end environment,
receive near-end audio from microphones associated with the group in the same near-end environment, and
send the near-end audio of at least one of the microphones to the far-end via the far-end connection.

22. A conferencing method, comprising:
capturing near-end audio at a first grouped device with a first microphone associated with the first grouped device;
determining, with the first grouped device, connection information in an acoustic beacon in the captured near-end audio, the acoustic beacon output by a second grouped device in a group at a same near-end environment with the first grouped device; and
connecting the first grouped device via a near-end connection with the second grouped device in the same near-end environment by using the connection information determined from the acoustic beacon.

23. A programmable storage device having program instructions stored thereon for causing a programmable control device to perform a method of claim 22.

24. A first grouped device in a group at a same near-end environment with a second grouped device connected to a far-end outside the near-end environment, the first grouped device comprising:
- an audio interface obtaining near-end audio captured with a first microphone associated with the first grouped device in the near-end environment;
- a network interface for connecting to one or more networks; and
- a processing unit communicatively connected to the audio and network interface and configured to:
  - determine connection information in an acoustic beacon in the captured near-end audio, the acoustic beacon output by the second grouped device in the near-end environment; and
  - use the connection information determined from the acoustic beacon to connect to the second device with the network interface via a near-end connection in the near-end environment.

* * * * *